United States Patent [19]

Welsch et al.

[11] Patent Number: 4,485,521
[45] Date of Patent: Dec. 4, 1984

[54] SHOCK ABSORBING CASTER PROVIDED WITH AN ELASTOMERIC MEMBER TO PREVENT WATER COLLECTION THEREIN

[75] Inventors: John H. Welsch, Moscow, Pa.; Bernard D. McLean, Springfield, Mass.

[73] Assignee: Metropolitan Wire Corporation, Wilkes-Barre, Pa.

[21] Appl. No.: 390,531

[22] Filed: Jun. 21, 1982

[51] Int. Cl.$^3$ ............................................. B60B 33/00
[52] U.S. Cl. .................. 16/44; 16/DIG. 36; 267/63 R
[58] Field of Search .............. 16/18 R, 44, 45, 107, 16/DIG. 36; 267/63 R, 153; 280/687, 716

[56] References Cited

U.S. PATENT DOCUMENTS

| 2,442,831 | 6/1948 | Suttles ............................ 16/44 |
| 4,346,498 | 8/1982 | Welsch et al. ..................... 16/44 |

FOREIGN PATENT DOCUMENTS

| 624904 | 8/1961 | Canada .................................... 16/44 |
| 2833330 | 2/1980 | Fed. Rep. of Germany .......... 16/44 |
| 357523 | 11/1961 | Switzerland ........................... 16/44 |
| 860352 | 2/1961 | United Kingdom ................... 16/44 |

Primary Examiner—Fred A. Silverberg
Attorney, Agent, or Firm—Goodman & Teitelbaum

[57] ABSTRACT

A shock absorbing caster including a wheel positioned between a yoke member and a cap member disposed over the yoke member, the cap member being pivotally secured to the yoke member to permit limited rotational movement therebetween. A shock pad of elastomeric material is positioned between the yoke member and the cap member for resiliently cushioning the pivotal rotational movement between the yoke and cap members. A bolt secures the shock pad to the cap member to limit the rotational movement between the yoke and cap members. The rear portion of the shock pad is vertically spaced from the cap member to provide a rear opening to allow cleaning thereof and prevent collection of water therein.

9 Claims, 4 Drawing Figures

SHOCK ABSORBING CASTER PROVIDED WITH AN ELASTOMERIC MEMBER TO PREVENT WATER COLLECTION THEREIN

RELATIONSHIP TO OTHER APPLICATIONS

This application is related to co-pending application Ser. No. 182,437 filed on Aug. 29, 1980, for a Shock Resistant Caster Assembly, now U.S. Pat. No. 4,346,498, assigned to the same assignee, in which the present applicant John H. Welsch is a joint inventor.

BACKGROUND OF THE INVENTION

This invention relates to caster assemblies, and more particularly to a shock absorbing caster.

In movable equipment, casters are usually utilized to facilitate mobility. Typically, the casters include wheels supported within a yoke assembly. The yoke assembly can be adapted to be fixed to the mobile equipment or can be coupled to a swivel mechanism, such as a ball bearing assembly, for rotational movement beneath the mobile equipment. Frequently, the casters may be subject to impact loading on the mobile equipment, which may cause damage to the casters. Accordingly, it is beneficial to have the casters provided with some sort of shock resistant or shock absorbing capabilities.

In the aforementioned patent application, there is described a shock resistant caster assembly utilizing a shock pad located between two parts of a housing, with the housing being coupled to a wheel. The shock pad is formed of a flat elastomeric member having a hollow recess formed in one surface thereof to define a frame of elastomeric material around the recess. The elastomeric member is retained in place on one part of the housing by means of a locating tab extending from the one part of the housing with the tab being received within a locating slot provided in the elastomeric member. The two parts of the housing are held together by means of a bolt passing through aligned openings in the two parts of the housing.

The aforementioned caster assembly provides beneficial improvement over prior art caster assemblies. Such improvement facilitates utilization of the aforementioned caster assembly in such industries as the food service industry, the medical equipment industry, and the like where it is essential that all parts be readily cleaned. By avoiding the use of complex spring mechanisms, reducing the number of parts, and other design improvements, the retention of contamination in the caster assembly is substantially reduced so as to permit utilization of the caster in those industries having particular sanitary requirements.

Nevertheless, still further improvement over the casters can be achieved. For example, the presence of the retaining tab positioned within the locating slot can possibly cause some entrapment of water during a cleaning operation. The water may then possibly drip through the slot during subsequent use. Additionally, the recess in the elastomeric material may retain water vapor which can possibly accumulate. Also, the particular bolt which couples the two parts of the housing together is spaced from a horizontal surface so as to cause relative difficulty in cleaning the area.

Accordingly, while the aforementioned caster assembly can be utilized in sanitary requirements, still further improvements would be desirable.

SUMMARY OF THE INVENTION

Accordingly, it is an object of the present invention to provide a shock absorbing caster which improves upon prior art casters.

Another object of the present invention is to provide a shock absorbing caster which can be easily cleaned, and which prevents the collection of cleaning water therein.

Yet another object of the present invention is to provide a shock absorbing caster which can be easily manufactured, can be readily assembled, is sturdy, durable and easily maintained.

Still a further object of the present invention is to provide a shock absorbing caster which permits pivotal rotation between housing members thereof so as to absorb the shock impacting upon the caster and to limit rotation between the housing member parts.

Briefly, in accordance with the present invention, there is provided a shock absorbing caster having a wheel with an opening therethrough to define a rotational axis, and a U-shaped yoke member including a pair of legs separated by a bight portion. A suitable coupling arrangement is provided for rotational coupling of the wheel between the yoke legs at its rotational axis. A cap member sits over the yoke member. A pivot mechanism is provided for securing the cap member to the yoke member and also provides for limited pivotal rotation between these members about the pivot mechanism. An elastomeric member is positioned between the yoke member and the cap member for resiliently cushioning the rotational movement therebetween.

In a preferred embodiment of the present invention, the pivot mechanism includes a tubular member securely disposed on the bight portion of the yoke member. A pair of holes are provided in the cap member which are aligned with the tubular member. A rivet or bolt extends through the aligned holes and the tubular member for securing the yoke and cap members together, and for providing the pivotal movement between the yoke and cap members. An additional rivet or bolt, spaced from the pivotal bolt, passes through the cap member to provide a limit for the pivotal movement between the yoke and cap members, and simultaneously serves to retain the elastomeric member in place.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DETAILED DESCRIPTION OF THE PREFERRED EMBODIMENT

Figure 1:
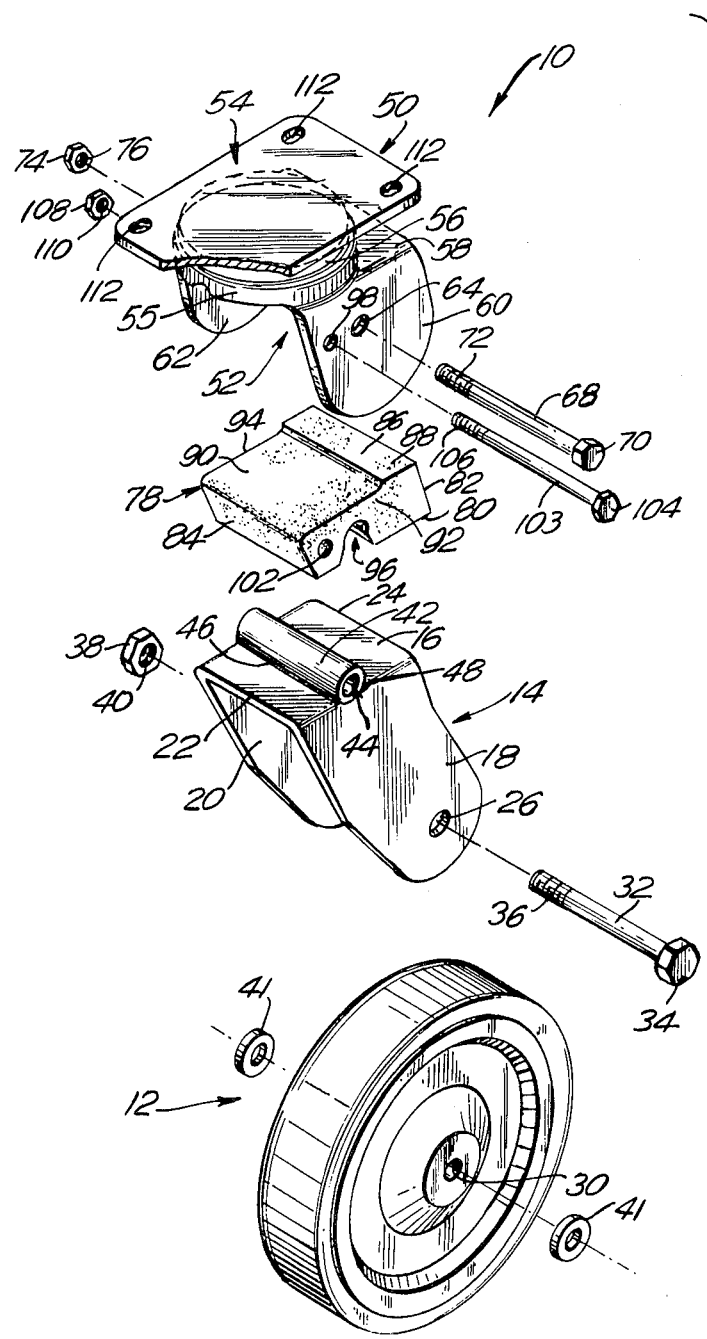
FIG. 1 is an exploded perspective view of the various parts of the caster in accordance with an embodiment of the present invention.

Referring now to the drawings, there is shown a caster 10 in accordance with the present invention including a wheel 12 mounted within a yoke member 14. The yoke member 14 is shown as an inverted U-shaped member having a bight portion 16 maintained in a substantially horizontal orientation with two downwardly depending legs 18, 20. The legs are forwardly directed from the rear edge 22 to the forward edge 24.

Figure 3:
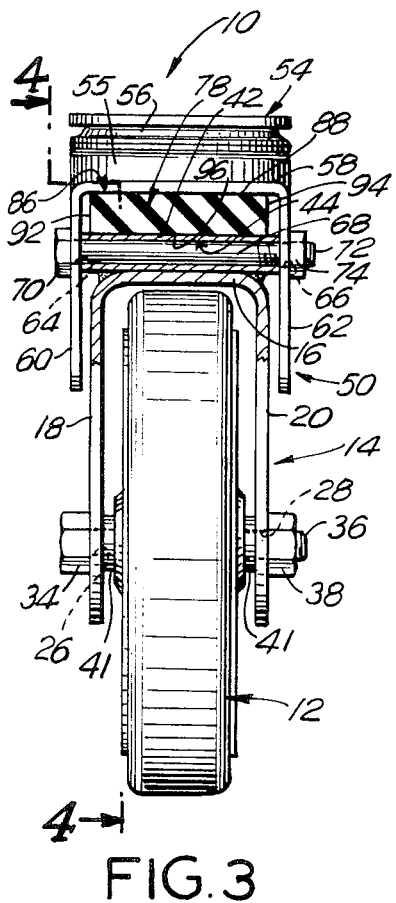
FIG. 3 is a partially broken away front view of the caster shown in FIG. 2.

Adjacent the distal ends of the legs 18, 20 are holes 26, 28 which are registered with the axle hole 30 of the wheel 12. An axle, shown as a bolt 32, having a bolt head 34 and a threaded end 36, passes through the registered holes 26, 28 and the axle hole 30 and is locked in place by means of the nut 38 having a threaded opening 40 therethrough, so as to provide axial rotation of the wheel 12 within the yoke member 14 about a first rotational axis. Preferably, conventional washers or spacers 41 are disposed on the bolt 32 between the wheel 12 and the yoke legs 18, 20 as shown in FIG. 3.

Disposed transversely across the upper surface of the yoke bight portion 16, is provided a tubular member 42 having a central opening 44 therethrough. The tubular member 42 is seated so that the opening 44 faces in the same direction as the yoke legs 18, 20, thereby being parallel to the axle bolt 32 when positioned in the yoke member 14. In the embodiment shown, the tubular member 42 is welded onto the bight surface by means of parallel welds 46, 48. It should be understood, that the tubular member 42 could be secured on the upper surface of the bight portion utilizing other suitable means.

Positioned above the yoke member 14, there is provided a cap member 50. The cap member 50 is shown to include a substantially inverted U-shaped lower portion 52 coupled to an upper connecting portion 54 by means of intermediate neck portions 55 and 56. The lower inverted U-shaped portion 52 includes an upper horizontal bight section 58 with downwardly depending arms 60, 62. Adjacent the medial edge of the arms 60, 62 there are provided circular clearance holes 64, 66 which are registered with the opening 44 in tubular member 42. A fastening member, shown as the bolt 68, having a bolt head 70 and a threaded end 72, passes through the clearance holes 64, 66 and the opening 44, and is locked in place by means of the nut 74 having a threaded opening 76 therethrough. Thus, the bolt 68 fastens the cap member 50 to the yoke member 14.

Sandwiched between the cap member 50 and the yoke member 14 is a shock pad, shown as the elastomeric member 78. The elastomeric member 78 is formed as a flat pad of substantially rectangular shape so as to fit between the bight portion 16 of the yoke member 14 and the lower surface of the horizontal bight section 58 of the cap member 10.

More specifically, the elastomeric member is shown to include a lower surface 80, a forward surface 82, a rear surface 84, and an upper surface 86. The upper surface 86 includes a stepped surface having two portions at different planar levels, thus providing an upper level 88 and a slightly lower level 90. The upper level 88 extends between the bight portion 16 and the underside of the horizontal bight section 58, as can best be seen in FIG. 4. The lower level 90 provides an opening at the rear of the caster, the lower level 90 being spaced from the underside of the horizontal bight section 58 to allow for easy cleaning thereof while preventing the collection of water therein. Preferably, the lower level 90 is slightly pitched toward the rear to let washing water drip off its surface, as can best be seen in FIG. 4. The elastomeric member 78 further includes the sidewalls 92 and 94. In order to accommodate the tubular member 42, a channel 96 is formed into the lower surface 80 of the elastomeric member to receive the tubular member 42 therein.

Figure 4:
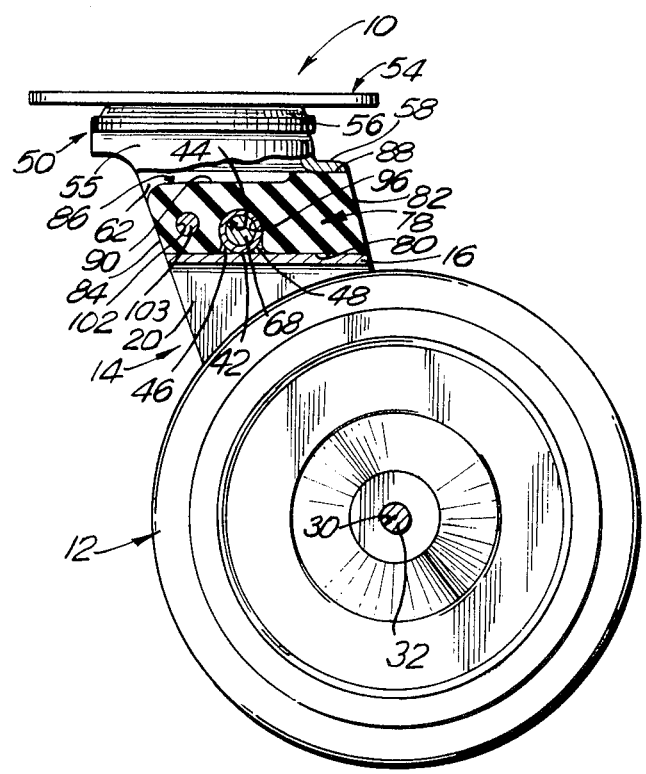
FIG. 4 is a partially broken away sectional view taken along lines 4—4 of FIG. 3.

Two additional aligned openings 98 are formed in the downwardly depending arms 60, 62 of the cap member 50. The aligned openings 98 are rearward of and slightly smaller than the clearance holes 64, 66, the centers of the openings 98 being slightly above the centers of the holes 64, 66. A transverse clearance hole 102 is formed through the elastomeric member 78 in alignment with the holes 98. A bolt 103, having a bolt head 104 and a threaded end 106 passes through the holes 98 and through the clearance hole 102, and is fastened at its threaded end 106 by means of the nut 108, having a threaded opening 110 therethrough. The bolt 103 serves to limit the rotational movement, about a second rotational axis, of the yoke member 14 with respect to the cap member 50 in the rearward direction and simultaneously serves to retain the elastomeric member 78 suitably in place. For example, without the bolt 103, the yoke member 14 would be free to rotate in a rearward clock-wise direction about the bolt 68, as shown in FIG. 4., because the elastomeric member 78 does not engage the cap bight section 58 at the rear of the caster. However, the engagement of the cap bight section 58 at the front of the caster against the upper level 88 of the elastomeric member 78, prevents rotation in a forward counterclock-wise direction.

Figure 2:
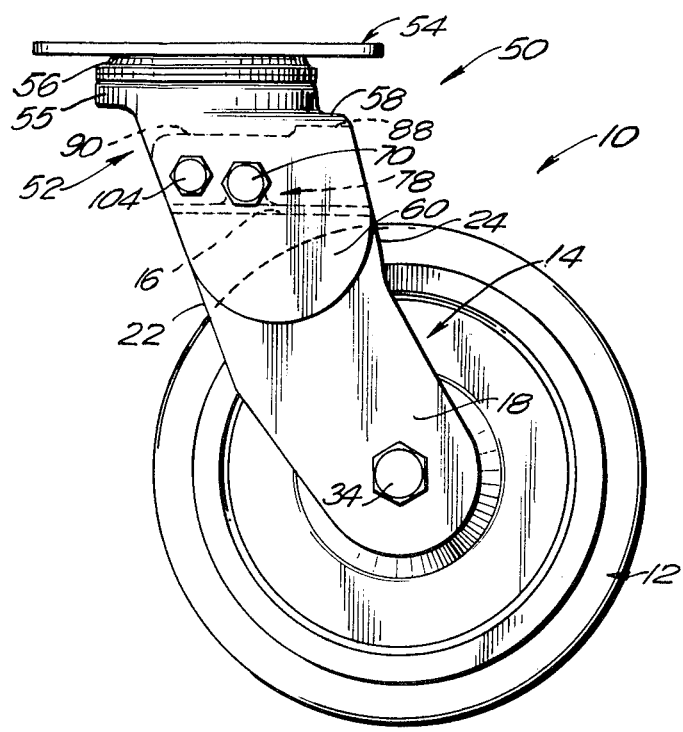
FIG. 2 shows a side elevational view of the assembled caster shown in FIG. 1.

With the caster assembled as shown in FIGS. 2-4, the upper cap member 50 and the yoke member 14 will be pivotally rotational with respect to each other. As a result, shocks appearing on the caster 10 can be absorbed by the cushioning effect of the elastomeric member 78 which cushions the pivotal rotation between the yoke member and the cap member. At the same time, rotation in the rearward direction, as set forth above, is limited by means of the bolt 103, which serves as a stop. As a result, when the caster 10 is lifted from the floor, the bolt 103 serves as a limit to the rearward rotation of the yoke member 14. Additionally, the bolt 103 simultaneously serves to hold the elastomeric member 78 in place.

With the assembly as shown, the sanitary capabilities are improved. The bolt 68, which serves to hold the yoke member 14 and cap member 50 together is not spaced from the yoke member 14, and accordingly there is no space or gap which might otherwise be difficult to clean. Furthermore, there is avoided any recesses which can accommodate retention of water. The only opening provided is the rear space between the elastomeric member surface 90 and the cap member 50, and this rear space is large enough to allow easy cleaning and prevent the collection of water therein. Any water that might be retained can drip out by means of the rearly sloping surface of the lower surface 90.

An additional improvement of the present invention is that the cap member 50 is such that the manufacture thereof conforms to the standard method used for the conventional structure of prior art casters which do not have the improved shock absorbing benefits of the present invention. All that is needed is to provide a blank correspondingly shaped so as to produce the desired cap member of the present invention, whereby the same conventional dies and apparatus utilized to form the standard parts in a conventional prior art caster can be utilized to form the cap member in the present shock absorbing caster.

The upper plate 54 is shown to include four apertures 112 for mounting the caster 10 directly onto the lower surface of the mobile equipment such as cart, wherein the apertures 112 receive suitable fastening members not shown therethrough, such as bolts, rivets, or the like. It is understood that other caster mounting means can be substituted for the upper plate 54 without departing from the present invention.

Contained within the neck portions 55, 56 of the cap member 50, there is a suitable swivel mechanism (not shown). Such swivel mechanism is readily known in the caster art, and can include any type of ball bearing assembly. One such type of swivel mechanism is shown in the aforementioned co-pending patent application, the entire disclosure of which is incorporated herein by reference. It should be also appreciated, that instead of the swivel mechanism, as shown, it is possible to have a fixed or rigid type of caster which would eliminate the requirement for the swivel portions 55, 56 therebetween. This type of fixed mounting arrangement is also described in the aforementioned co-pending application, and can be utilized instead of the swivel mechanism as shown.

Although bolts and nuts were utilized for the various parts, as shown in the drawings, it should be understood that rivets or other type of fastening pins could be utilized. Other modifications could also be achieved within the scope of the present invention.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A shock absorbing caster comprising:
   a wheel having an opening therethrough to define a first rotational axis;
   a U-shaped yoke member having a pair of legs separated by a bight portion;
   coupling means at said first rotational axis for rotationally coupling said wheel between said legs;
   a cap member sitting over said yoke member;
   pivot means securing said cap member to said yoke member to permit rotational movement therebetween about a second rotational axis;
   elastomeric means positioned between said yoke member and said cap member for resiliently cushioning said rotational movement about said second rotational axis;
   said elastomeric means including a substantially rectangular elastomeric body portion having a lower surface;
   said lower surface juxtaposed to said yoke bight portion on both sides of said pivot means for resiliently cushioning said rotational movement about said second rotational axis;
   said elastomeric body portion including open means to allow cleaning thereof and to prevent collection of water therein, said open means including an upper surface on said elastomeric body portion with a first portion of said upper surface being at a lower planar level than a second portion of said upper surface, said first portion being vertically spaced from said cap member to provide an opening for the cleaning and prevention of water collection, said first portion having a slight vertical pitch to allow washing water to drain therefrom;
   said second portion of said upper surface being disposed so as to abut against said cap member and said yoke member upon rotation in one direction about said second rotational axis, thereby to limit amount of said rotational movement about said second rotational axis;
   stop means for securing said elastomeric body portion to said cap member to retain said elastomeric body portion in position; and
   said stop means limiting the amount of rotational movement in one direction about said second rotational axis and also acting to maintain said vertical spacing between said cap member and said first portion of said upper surface of said elastomeric member.

2. A shock absorbing caster as in claim 1, wherein said pivot means includes a tubular member secured on said yoke bight portion, said tubular member being parallel to said first rotational axis, a pair of holes provided in said cap member aligned with said tubular member, and fastening means extending through said aligned holes and tubular member for providing pivotal movement between said yoke and cap members.

3. A shock absorbing caster as in claim 2, wherein said cap member includes downwardly depending arms, and wherein said holes extends through said arms for receiving said fastening means.

4. A shock absorbing caster as in claim 3, wherein said stop means includes rod means and a pair of aligned openings in said arms rearward of said holes, said rod means extending through said aligned openings and through said elastomeric means to be positioned in spaced apart, overlying relationship with said yoke bight portion.

5. A shock absorbing caster as in claim 4, wherein said elastomeric means includes a transverse passageway therethrough aligned with said openings for receiving said rod means therein, said rod means being parallel to said fastening means.

6. A shock absorbing caster as in claim 2, wherein said tubular member is weldingly secured onto said yoke bight portion.

7. A shock absorbing caster as in claim 2, wherein said fastening means includes a bolt, and further comprising locking means for securing said bolt in place.

8. A shock absorbing caster as in claim 1, wherein said lower surface of said elastomeric body portion is provided with a channel to accommodate said pivot means therein.

9. A shock absorbing caster as in claim 1, wherein said upper surface of said elastomeric body portion is stepped to provide the two planar levels.

* * * * *